United States Patent
Bao et al.

(10) Patent No.: US 10,083,346 B2
(45) Date of Patent: Sep. 25, 2018

(54) METHOD AND APPARATUS FOR PROVIDING CONTACT CARD

(71) Applicant: Xiaomi Inc., Beijing (CN)

(72) Inventors: Xiehao Bao, Beijing (CN); Shiding Qiu, Beijing (CN); Kun Niu, Beijing (CN)

(73) Assignee: Xiaomi Inc., Beijing (CN)

( * ) Notice: Subject to any disclaimer, the term of this patent is extended or adjusted under 35 U.S.C. 154(b) by 145 days.

(21) Appl. No.: 15/165,236

(22) Filed: May 26, 2016

(65) Prior Publication Data

US 2016/0350584 A1    Dec. 1, 2016

(30) Foreign Application Priority Data

May 26, 2015   (CN) .......................... 2015 1 0276603

(51) Int. Cl.
| | |
|---|---|
| *G06K 9/46* | (2006.01) |
| *G06K 9/66* | (2006.01) |
| *G06K 9/00* | (2006.01) |
| *G06K 9/62* | (2006.01) |
| *G06Q 10/10* | (2012.01) |
| *G06Q 50/00* | (2012.01) |

(52) U.S. Cl.
CPC ..... *G06K 9/00268* (2013.01); *G06K 9/00483* (2013.01); *G06K 9/46* (2013.01); *G06K 9/6201* (2013.01); *G06Q 10/101* (2013.01); *G06Q 50/01* (2013.01)

(58) Field of Classification Search
CPC .... G06K 9/00268; G06K 9/6201; G06K 9/46; G06K 9/00483; G06Q 50/01; G06Q 10/01
See application file for complete search history.

(56) References Cited

U.S. PATENT DOCUMENTS

| | | | |
|---|---|---|---|
| 8,810,684 B2 | 8/2014 | Chang | |
| 2010/0287053 A1* | 11/2010 | Ganong | ............ G06F 17/30247 705/14.66 |
| 2011/0249144 A1* | 10/2011 | Chang | ............... G06F 17/30259 348/231.3 |

(Continued)

FOREIGN PATENT DOCUMENTS

| | | |
|---|---|---|
| CN | 102143485 | 8/2011 |
| CN | 102270296 | 12/2011 |

(Continued)

OTHER PUBLICATIONS

Cloud computing, From Wikipedia, the free encyclopedia, dated May 22, 2015, 16 pages.

(Continued)

*Primary Examiner* — Samir Ahmed
(74) *Attorney, Agent, or Firm* — Finnegan, Henderson, Farabow, Garrett & Dunner LLP

(57) ABSTRACT

A method for providing a contact card is provided. The method includes: acquiring a contact card of a contact person and acquiring contact information stored in a user terminal, the contact card including a first photo, and the contact information including a second photo; determining whether the first photo matches the second photo; and providing the contact card of the contact person to the user terminal, if the first photo matches the second photo.

15 Claims, 14 Drawing Sheets

(56) References Cited

U.S. PATENT DOCUMENTS

| | | | | |
|---|---|---|---|---|
| 2013/0332530 | A1* | 12/2013 | Yokoyama | H04L 65/403 709/204 |
| 2014/0055553 | A1* | 2/2014 | Lee | G06K 9/00288 348/14.07 |
| 2014/0126825 | A1* | 5/2014 | Luo | G06Q 10/10 382/190 |
| 2015/0088914 | A1* | 3/2015 | Zeng | H04L 67/22 707/751 |
| 2015/0131872 | A1* | 5/2015 | Ganong | G06K 9/00677 382/118 |
| 2016/0012280 | A1* | 1/2016 | Ito | G06K 9/00288 382/305 |

FOREIGN PATENT DOCUMENTS

| | | |
|---|---|---|
| CN | 103440346 | 12/2013 |
| CN | 103973865 | 8/2014 |
| CN | 104243276 | 12/2014 |
| CN | 104584539 | 4/2015 |
| CN | 105100193 | 11/2015 |
| EP | 2731048 A1 | 5/2014 |
| JP | 2014522020 A | 8/2014 |
| KR | 20060052916 | 5/2006 |
| KR | 20060080995 | 7/2006 |
| KR | 20110012602 | 2/2011 |
| KR | 20140053504 | 5/2014 |
| RU | 2013128582 A | 12/2014 |

OTHER PUBLICATIONS

Extended European Search Report from European Patent Office for European Application No. 16170426.7, dated Aug. 30, 2016, 24 pages.

Notification of Reason for Refusal from Korean Intellectual Property Office for Korean Application No. 10-2016-7015099 and English translation thereof, dated Jan. 13, 2017, 13 pages.

International Search Report and Written Opinion of International Application No. PCT/CN2015/095333, dated Feb. 17, 2016, and English translation thereof, 15 pages.

Camastra, Chapter 13: "Automatic Face Recognition" in "Machine Learning for Audio, Image and Video Analysis: Theory and Applications", dated Dec. 31, 2008, pp. 381-411.

* cited by examiner

US 10,083,346 B2

METHOD AND APPARATUS FOR PROVIDING CONTACT CARD

CROSS-REFERENCE TO RELATED APPLICATION

This application is based upon and claims priority to Chinese Patent Application 201510276603.9, filed May 26, 2015, the entire contents of which are incorporated herein by reference.

TECHNICAL FIELD

The present disclosure generally relates to the field of computer technology and, more particularly, to a method and an apparatus for providing a contact card.

BACKGROUND

With the rapid development of computer technology, smart terminals have been widely used in people's daily life. Social network applications often are installed in the smart terminals, where contact information and photos of the contact person in the applications may not exactly match the records stored in the user terminal. A user may also upload the contact information and photo in the user terminal to a server for generating and publishing a contact card in a cloud network, such that other users may view the contact card of this contact person.

SUMMARY

According to a first aspect of the present disclosure, there is provided a method for providing a contact card, comprising: acquiring a contact card of a contact person and acquiring contact information stored in a user terminal, the contact card including a first photo, and the contact information including a second photo; determining whether the first photo matches the second photo; and providing the contact card of the contact person to the user terminal, if the first photo matches the second photo.

According to a second aspect of the present disclosure, there is provided an apparatus for providing a cloud card, comprising: a processor; and a memory for storing instructions executable by the processor. The processor is configured to: acquire a contact card of a contact person and acquire contact information stored in a user terminal, the contact card including a first photo, the contact information including a second photo; determine whether the first photo matches the second photo; and provide the contact card of the contact person to the user terminal, if the first photo matches the second photo.

According to a third aspect of the present disclosure, there is provided a non-transitory computer-readable storage medium having stored therein instructions that, when executed by a server, cause the server to perform a method for providing a contact card, the method comprising: acquiring a contact card of a contact person and acquiring contact information stored in a user terminal, the contact card including a first photo, the contact information including a second photo; determining whether the first photo matches the second photo; and providing the contact card of the contact person to the user terminal, if the first photo matches the second photo.

It is to be understood that both the foregoing general description and the following detailed description are example and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
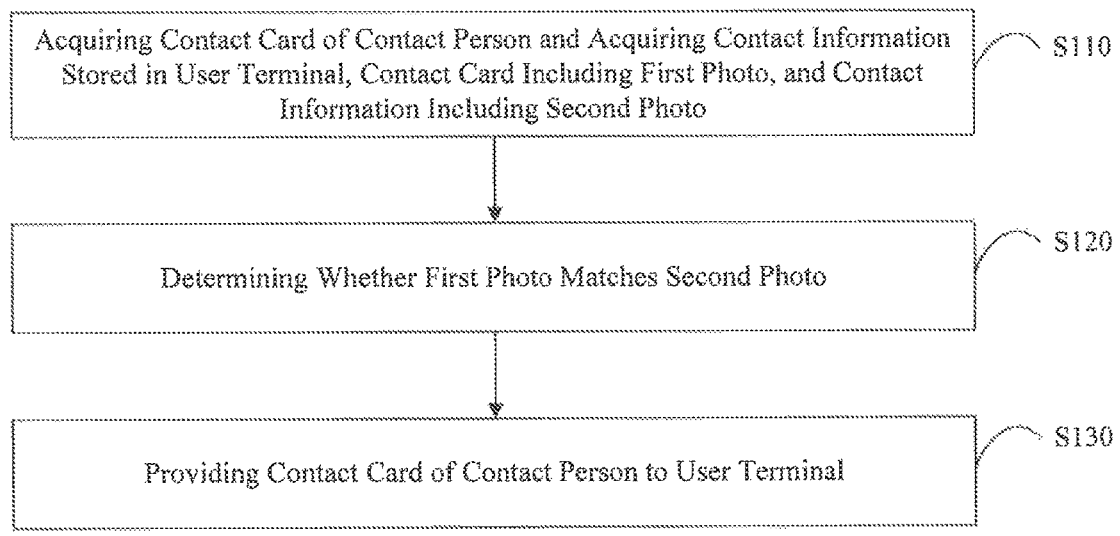
FIG. 1 is a flowchart of a method for providing a contact card, according to an example embodiment.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims.

Conventionally, a user may upload the contact information and photo in the user records to a server for generating and publishing a contact card in the cloud network, such that other users may view the contact card of this contact person. For example, user A's information such as name, address, is stored in a server of a cloud network as user A's contact card, and user A's information such as name, address is stored in a terminal of user B as user B's contact records. If it is determined that the user A's contact card matches person A stored in the user B's contact records, user A's contact card stored in the cloud network may be provided to user B.

In practical implementations, however, information in user A's contact card in the cloud network may not exactly match the information of contact person A stored in user B's terminal. For example, assuming user A is the user B's father, and user A's contact card stored in a server of a cloud network includes a name as "Wang Er". However, in contact records of user B's terminal, user A's name is listed as "Dad". Accordingly, user A's contact card in the cloud network does not match the information of contact person A stored in use B's terminal As another example, the address of user A's contact card in the cloud network is A's home address, while the address of user A in the contact records of user B's terminal is A's work address. As a result, user A's contact card in the cloud network does not match the information of contact person A in the use B's contact records. In the present disclosure, a contact card refers to a card containing a user's contact information that is stored in a server of a network. For example, a contact card may be a business card, a social profile, a website page, or the like.

Consistent with embodiments of the present disclosure, a method and an apparatus for providing a person's contact card in a cloud network is provided. For example, the contact card of a contact person having a matching contact photo with a person in records of a user terminal may be acquired in a server of the cloud network, and the contact card is pushed to the user terminal. By determining whether the contact card in the server matches the contact information stored in the user terminal according to an photo in the contact card and an photo in the contact information, the accuracy in matching the contact card stored in the server and the contact information stored in the user terminal can be improved.

FIG. 1 is a flowchart of a method 100 for providing a cloud card, according to an example embodiment. For example, the method 100 may be performed by a server. Referring to FIG. 1, the method 100 includes the following steps.

In step S110, the server acquires a contact card of a contact person and acquires contact information stored in a user terminal, the contact card including a first photo, and the contact information including a second photo. For example, the contact card may be acquired locally in the server, and the contact information may be acquired from the user terminal.

In step S120, the server determines whether the first photo matches the second photo.

In step S130, the server provides the contact card of the contact person to the user terminal, if the first photo matches the second photo.

In the method 100, by determining whether the contact card in the server matches the contact information stored in the user terminal according to the first and second photo, the accuracy in matching the contact card in the cloud network and the contact information in the user terminal can be improved.

In some embodiments, step S120 may include sub-steps A1 and A2 described as follows.

In sub-step A1, the server calculates a first similarity degree between the first photo and the second photo.

In sub-step A2, if the first similarity degree is greater than or equal to a predetermined similarity degree, the server determines that the first photo matches the second photo.

By determining whether the first photo matches the second photo based on the similarity degree, the accuracy in matching the contact card in the server and the contact information in the user terminal can be improved when a slight mismatch exists between the first photo in the contact card and the second photo in the contact information.

In some embodiments, step S120 may include sub-steps B1-B3 described as follows.

In sub-step B1, the server identifies a face image from each of the first photo and the second photo.

In sub-step B2, the server compares the face image of the first photo with the face image of the second photo.

In sub-step 133, if the face image of the first photo matches the face image of the second photo, the server determines that the first photo matches the second photo.

By determining whether the first photo matches the second photo based on the face images, the accuracy and efficiency in matching the contact card in the server and the contact information in the user terminal can be improved.

In some embodiments, step S120 may further include sub-steps C1 and C2 described as follows.

In sub-step C1, if the first similarity degree between the first photo and the second photo reaches a predetermined similarity degree, the server determines an occurrence number of the first photo and/or the second photo in photos of contact cards stored in the server.

In sub-step C2, if the occurrence number is less than or equal to a predetermined number, the server determines that the first photo matches the second photo.

Where the person in the contact card is different from the person in the contact information, the first photo could still sometimes match the second photo. In the above-described embodiment, when the occurrence number of the first photo and/or the occurrence number of the second photo is greater than the predetermined number, it may be determined that the photo is associated with a plurality of contact persons rather a same person. Thus, by determining that the first photo matches the second photo when the occurrence number is less than or equal to the predetermined number, the accuracy in determining whether the first photo matches the second photo can he improved.

In some embodiments, step S120 may further include sub-steps D1-D3 described as follows after step C2.

In sub-step D1, if the occurrence number is greater than the predetermined number, the server calculates a second similarity degree between the first photo and the second photo according to the occurrence number and the first similarity degree. The greater the occurrence number is, the smaller the second similarity is.

In sub-step D2, the server determines whether the second similarity degree reaches the predetermined similarity degree.

In sub-step D3, if the second similarity degree is less than the predetermined similarity degree, the server determines that the first photo does not match the second photo.

As different contact persons may sometimes have matched network photos, when the occurrence number of the first photo or the second photo is high, it is likely that the photo is associated with a plurality of contact persons rather than a same person. Thus, by determining a second similarity degree based on the occurrence number, the accuracy in determining whether the first photo matches the second photo can he improved.

In some embodiments, the method 100 may further include steps E1 and E2 described as follows.

in step E1, the server performs a normalization process on the first photo and the second photo to obtain a normalized photo of each of the first photo and the second photo.

In step E2, the server identifies one or more feature points from each normalized photo according to a predetermined rule.

Correspondingly, step S120 may include sub-steps E3 and E4 described as follows.

In sub-step E3, the server compares the feature points of the normalized photo of the first photo and the second photo.

In sub-step E4, the server determines whether the first photo matches the second photo according to a comparison result of the feature points.

By comparing the feature points of the normalized photo of the first photo and the second photo, the accuracy and efficiency in matching the contact card in the server and the contact information in the user terminal can be improved.

In some embodiments, the method 100 may further include steps F1 and F2 described as follows.

In step F1, the server performs a normalization process on the face image of each of the first photo and the second photo to obtain a normalized face image of each of the first photo and the second photo.

In step F2, the server identifies one or more feature points from the normalized face images according to a predetermined rule.

Correspondingly, step S120 may include sub-steps F3 and F4 described as follows.

In sub-step F3, the server compares the feature points of the normalized face image of the first photo and the second photo.

In sub-step F4, the server determines whether the face image of the first photo matches the face image of the second photo according to a comparison result of the feature points.

By comparing the feature points of the normalized face image of the first photo and the second photo, the accuracy and efficiency in matching the contact card in the server and the contact information in the user terminal can be improved.

Figure 2:
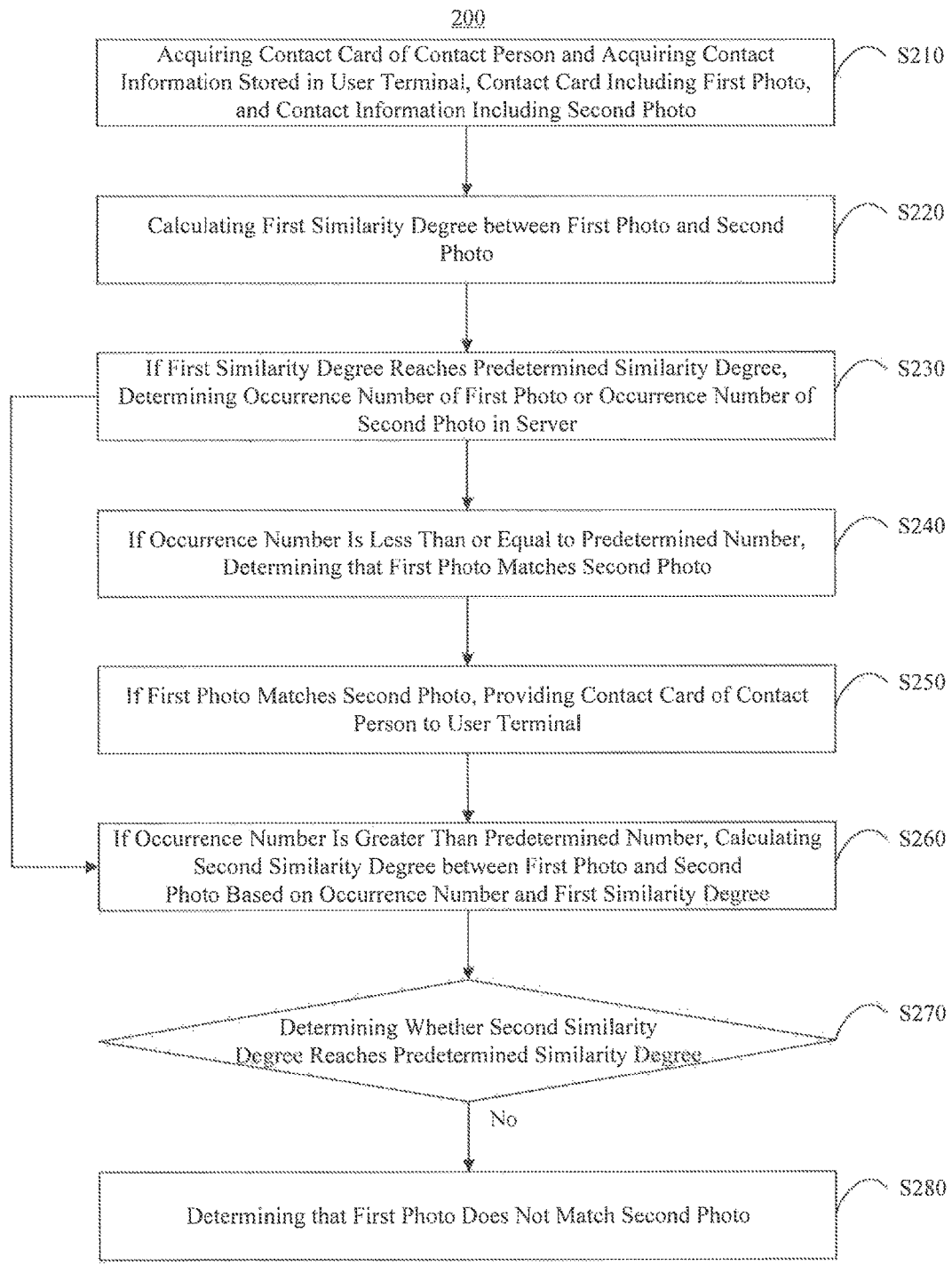
FIG. 2 is a flowchart of another method for providing a contact card, according to an example embodiment.

FIG. 2 is a flowchart of another method 200 for providing a contact card, according to an example embodiment. For example, the method 200 may be performed by a server. Referring to FIG. 2, the method 200 includes the following steps.

In step S210, the server acquires a contact card of a contact person and acquires contact information stored in a user terminal, the contact card including a first photo, and the contact information including a second photo. For example, the server acquires user A's contact card locally and acquires the contact information of person C stored in the terminal of the user B.

In step S220, the server calculates a first similarity degree between the first photo and the second photo. In one example, the first similarity degree between the first photo and the second photo may be calculated as 0.8.

In step S230, if the first similarity degree reaches a predetermined similarity degree, the server determines an occurrence number of the first photo and/or an occurrence number of the second photo in photos stored in the server. If the occurrence number is less than or equal to a predetermined number, steps S240 and S250 are executed. If the occurrence number is greater than the predetermined number, steps S260 to S280 are executed.

In one example, the predetermined similarity degree is set as 0.6, the first similarity degree between the first photo of user A and the second photo of contact person C is 0.8, and the first similarity degree reaches the predetermined similarity degree. As the first similarity degree reaches the predetermined similarity degree, the server determines that the occurrence number of the first photo of user A in the photos stored in the server is 4, and the occurrence number of the second photo of person C in the photos stored in the server is 6.

In step S240, if the occurrence number is less than or equal to a predetermined number, the server determines that the first photo matches the second photo.

In one example, the predetermined number is set as 20. Continuing with the above example, it may be seen that both the occurrence number of the first photo of user A and the occurrence number of the second photo of contact person C stored in the server are less than the predetermined number. Accordingly, it may be determined that the first photo matches the second photo.

In step S250, the server provides the contact card of the contact person to the user terminal, if the first photo matches the second photo.

For example, when the first photo of user A matches the second photo of person C, it may be determined that user A and person C are the same person. Correspondingly, the contact card of the user A may be provided to the terminal of user B, such that user B may store the information of user A in contact information of person C.

In step S260, if the occurrence number is greater than the predetermined number, the server calculates a second similarity degree between the first photo and the second photo based on the occurrence number and the first similarity degree. The greater the occurrence number is, the smaller the second similarity degree is relative to the first similarity degree.

In one example, assuming the occurrence number of the first photo of the user A in the in the server is 30, and the occurrence number of the second photo of person C in the server is 60, the second similarity degree is inversely proportional to the occurrence number of the first photo of user A and the occurrence number of the second photo of person C. A plurality of levels may be set based on a range of the occurrence number, and each level corresponds to a different weight which is less than 1. The occurrence number is inversely proportional to the weight, that is, the weight decreases with an increase of the occurrence number. The first similarity degree is multiplied by the weight to obtain the second similarity degree as follows: the second similarity degree the first similarity degree×weight.

For example, the occurrence number of the first photo of user A is 30 and the occurrence number of the second photo of person C is 60, and then the combined occurrence number of the first and second photo is 90. Assuming an occurrence number of 90 of a photo corresponds to a weight of 0.5, the first similarity degree is calculated as 0.8, then the second similarity degree is calculated as 0.8×0.5=0.4. In another example, assuming the combined occurrence number of the first photo and second photo is 200, and the corresponding weight is 0.2, then the second similarity degree is calculated as 0.8×0.2=0.16.

In step S270, the server determines whether the second similarity degree reaches the predetermined similarity degree. For example, the second similarity degree of 0.4 is less than the predetermined similarity degree of 0.6.

In step S280, if the second similarity degree is less than the predetermined similarity degree, the server determines that the first photo does not match the second photo.

For example, where the second similarity degree of 0.4 is less than the predetermined similarity degree of 0.6, it may be determined that the first photo of user A and the second photo of person C are associated with two different users. Accordingly, it is determined that the first photo of user A does not match the photo of person C.

In the method 200, by determining the occurrence number of the first photo or the second photo as well as the second similarity degree, the possibility that different contact persons use the same photo is taken into account, thereby improving the accuracy in determining whether the first photo matches the second photo.

Figure 3:
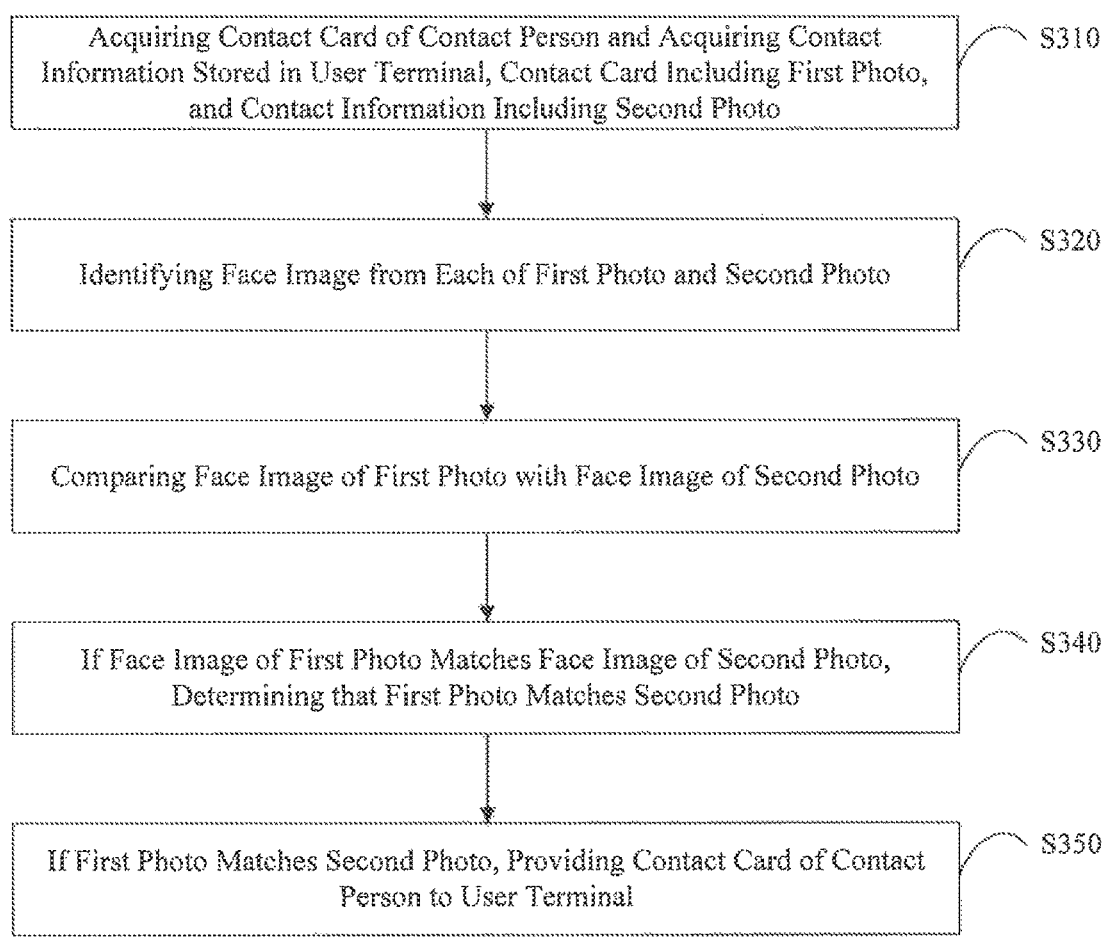
FIG. 3 is a flowchart of another method for providing a contact card, according to an example embodiment.

FIG. 3 is a flowchart of another method 300 for providing a contact card, according to an example embodiment. For example, the method 300 may be performed by a server. Referring to FIG. 3, the method 300 includes the following steps.

In step S310, the server acquires a contact card of a contact person and acquires contact information stored in a user terminal, the contact card including a first photo, and the contact information including a second photo. For example, the server acquires user A's contact card locally, and acquires contact information of person C from a terminal of user B.

In step S320, the server identifies a face image from each of the first photo and the second photo. For example, a face image A1 and a face image C1 are identified from the first photo of user A and the second photo of person C, respectively.

In step S330, the server compares the face image of the first photo with the face image of the second photo. For example, the face image A1 is compared with the face image C1.

In step S340, if the face image of the first photo matches the face image of the second photo, the server determines that the first photo matches the second photo. For example, when the face image A1 matches the face image C1, it is determined that the first photo of user A matches the second photo of the person C.

In step S350, if the first photo matches the second photo, the server provides the contact card of the contact person to the user terminal. For example, when the first photo of user A matches the photo of person C, it may be determined that user A and person C are the same person. Accordingly, the contact card of user A may be provided to the user terminal, such that user B may store the information of user A in the contact information of person C in the terminal of user B.

By determining Whether the first photo matches the second photo based on the face images, the accuracy and efficiency in matching the contact card in the server and the contact information in the user terminal can be improved.

Figure 4:
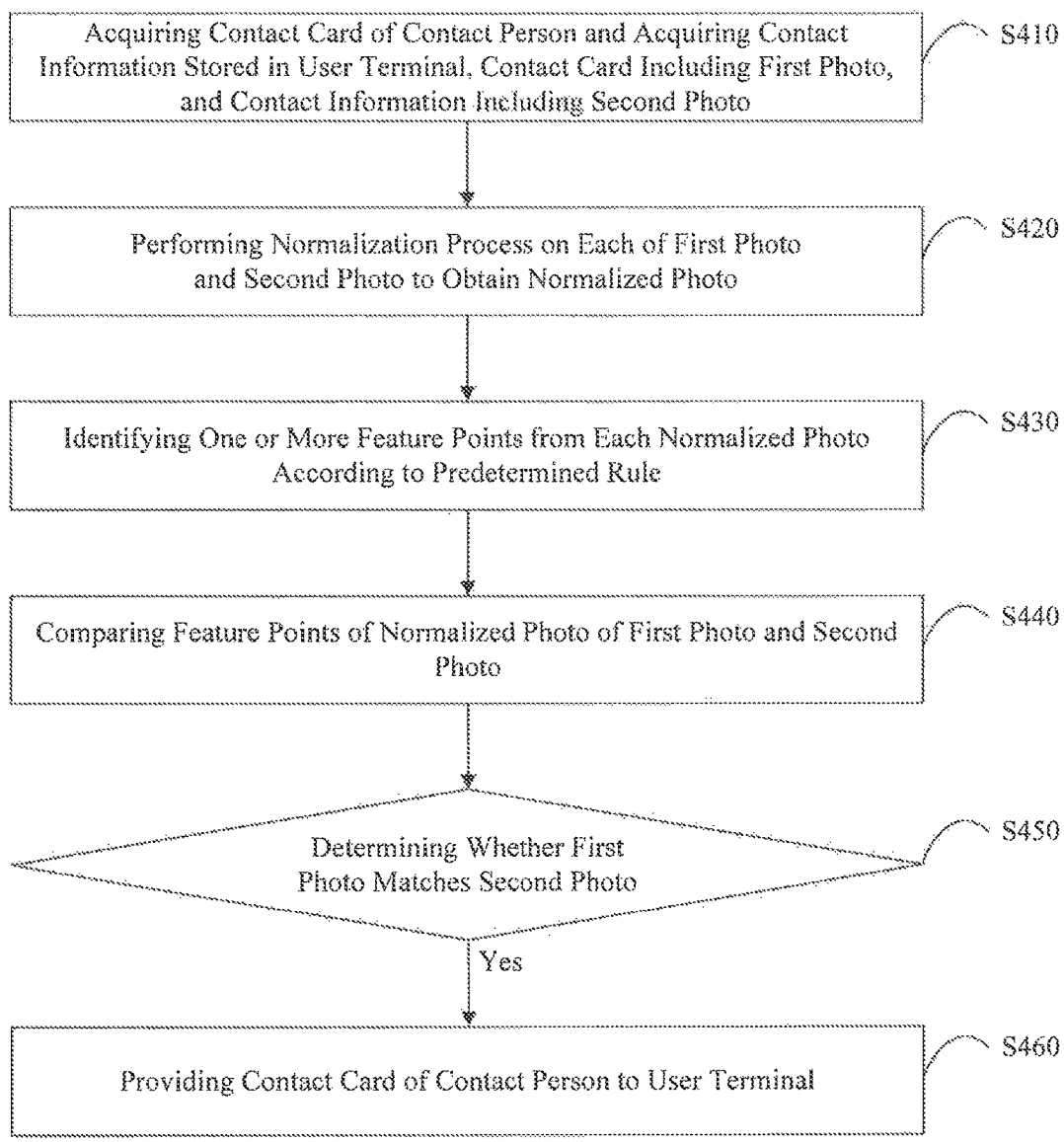
FIG. 4 is a flowchart of another method for providing a contact card, according to an example embodiment.

FIG. 4 is a flowchart of another method 400 for providing a contact card, according to an example embodiment. For example, the method 400 may be performed by a server. Referring to FIG. 4, the method 400 includes the following steps.

In step S410, the server acquires a contact card of a contact person and acquires contact information stored in a user terminal, the contact card including a first photo, and the contact information including a second photo. For example, the server acquires the user A's contact card locally, and acquires the contact information of person C from a terminal of user B.

In step S420, the server performs a normalization process on each of the first photo and the second photo to obtain a normalized photo. For example, the server may perform a normalization process on the first photo of user A and the second photo of person C to obtain a normalized photo D1 of the first photo and a normalized photo D2 of the second photo.

In step S430, the server identifies one or more feature points from each normalized photo according to a predetermined rule. For example, the same number of feature points may be identified from the normalized photo D1 and the normalized photo D2, such as 100 feature points. The number of feature points identified from normalized photo D1 and the normalized photo D2 is not limited the present disclosure, and the number of feature points identified from normalized photo D1 may be different from the number of feature points identified from normalized photo D2. For example, a feature point set 1 may be identified from normalized photo D1 and stored, and a feature point set 2 may be identified from normalized photo D2 and stored.

In step S440, the server compares the feature points of the normalized photo of the first photo and the second photo. For example, the feature point set 1 and the feature point set 2 are compared, and there are 78 identical feature points between the feature point set 1 and the feature point set 2.

In step S450, the server determines whether the first photo matches the second photo according to a comparison result of the feature points. For example, it may be determined that the first photo of user A matches the second photo of person C, according to the comparison result of step S440 that there are 78 identical feature points between the feature point set 1 and the feature point set 2.

In step S460, if the first photo matches the second photo, the server provides the contact card of the contact person to the user terminal. For example, when the first photo of user A matches the second photo of person C, it may be determined that user A and person C are the same person. Accordingly, the contact card of user A may be provided to the terminal of user B, such that user B may store the information of user A in the contact information of person C.

In the method 400, by comparing the feature points of the normalized photo of the first photo and the second photo, the accuracy and efficiency in determining whether the first photo matches the second photo can be improved.

Figure 5:
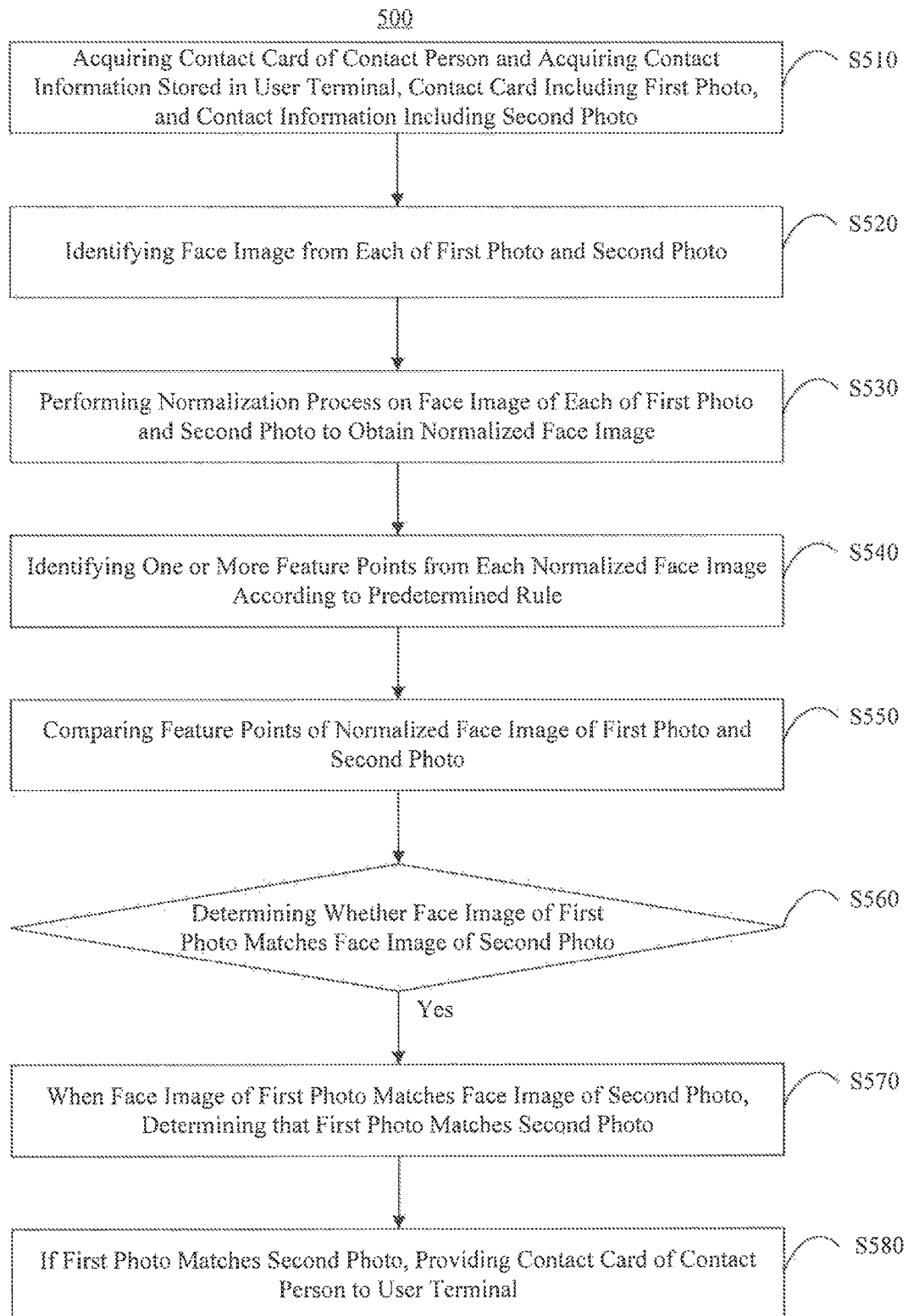
FIG. 5 is a flowchart of another method for providing a contact card, according to an example embodiment.

FIG. 5 is a flowchart of another method 500 for providing a contact card, according to an example embodiment. For example, the method 500 may be performed by a server. Referring to FIG. 5, the method 500 includes the following steps.

In step S510, the server acquires a contact card of a contact person and acquires contact information from a user terminal, the contact card including a first photo, and the contact information including a second photo. For example, the server acquires user A's contact card locally, and acquires the contact information of person C from the terminal of the user B.

In step S520, the server identifies a face image from each of the first photo and the second photo. For example, a face image E1 is identified from the first photo of user A, and a face image E2 is identified from the second photo of person C.

In step S530, the server performs a normalization process on the face image of each of the first photo and the second photo to obtain a normalized face image of each of the first photo and the second photo. For example, a normalization process is performed on the face image E1 of the first photo and the face image E2 of the second photo, so as to obtain the normalized face image F1 of the first photo and the normalized face image F2 of the second photo.

In step S540, the server identifies one or more feature points from the normalized face image according to a predetermined rule. For example, the same number of feature points may be identified from the normalized face images F1 and F2, such as 100 feature points. The number of feature points identified from normalized face images F1 and F2 is not limited by the present disclosure, and the number of feature points identified from the normalized face image F1 may be different from the number of feature points identified from the normalized face image F2. For example, a feature point set 1 may be identified from the normalized face image F1 and stored, and a feature point set 2 may be identified from the normalized face image F2 and stored.

In step S550, the server compares the feature points of the normalized face image of the first photo and the second photo. For example, the feature point set 1 and the feature point set 2 are compared, and there are 78 identical feature points between the feature point set 1 and the feature point set 2.

In step S560, the server determines whether the face image of the first photo matches the face image of the second photo according to a comparison result of the feature points. For example, it may be determined that the face image E1 of the first photo of user A matches the face image E2 of the second photo of person C, according to the comparison result of step S550 that there are 78 identical feature points between the feature point set 1 and the feature point set 2.

In step S570, when the face image of the first photo matches the face image of the second photo, the server determines that the first photo matches the second photo. For example, when the face image E1 of the first photo matches the face image E2 of the second photo, it is determined that the first photo of user A matches the second photo of person C. In some embodiments, the first photo may be determined as matching the second photo when the first photo and the second photo contain a same face, or the first photo and the second photo are the same, or the similarity degree between the first photo and the second photo exceeds a certain threshold.

In step S580, if the first photo matches the second photo, the server provides the contact card of the contact person to the user terminal. For example, when the first photo of user A matches the second photo of person C, it may be determined that user A and person C are the same person. Accordingly, the contact card of user A may be provided to the terminal of user B, such that user B may store the information of user A in the contact information of person C.

In the method 500, by comparing the feature points of the normalized face image of the first photo and the second photo, the accuracy and efficiency in determining whether the contact card stored in the server matches the contact information stored in the user terminal can be improved.

Figure 6:
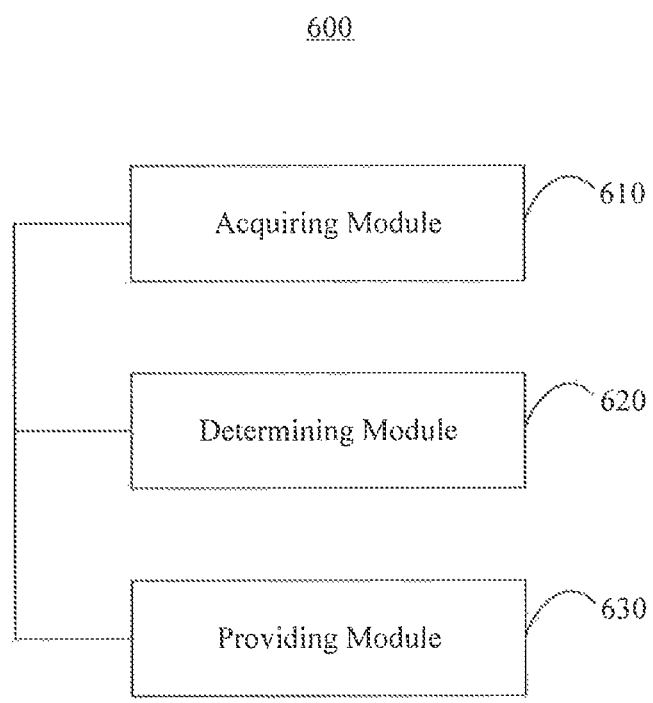
FIG. 6 is a block diagram of an apparatus for providing a contact card, according to an example embodiment.

FIG. 6 is a block diagram of an apparatus 600 for providing a contact card, according to an example embodiment. For example, the apparatus 600 may be implemented as a part or all of a server. Referring to FIG. 6, the apparatus 600 includes an acquiring module 610, a determining module 620, and a providing module 630.

The acquiring module 610 is configured to acquire a contact card of a contact person and to acquire contact information stored in a user terminal, the cloud card including a first photo, and the contact information including a second photo.

The determining module 620 is configured to determine whether the first photo matches the second photo.

The providing module 630 is configured to provide the contact card of the contact person to the user terminal, if the first photo matches the second photo.

Figure 7:
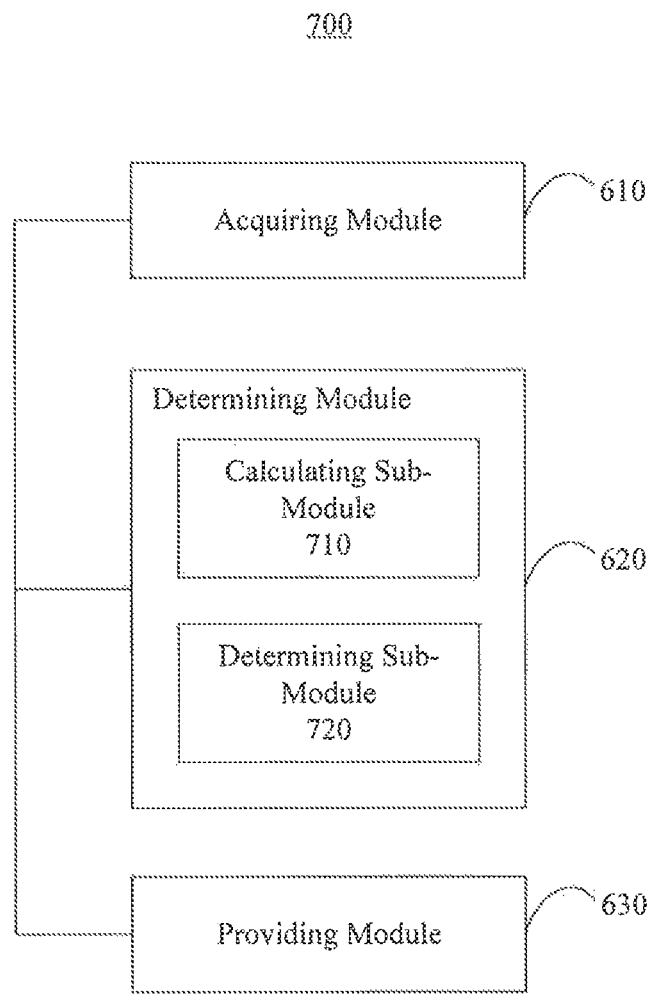
FIG. 7 is a block diagram of another apparatus for providing a contact card, according to an example embodiment.

FIG. 7 is a block diagram of another apparatus 700 for providing a contact card, according to an example embodiment. For example, the apparatus 700 may be implemented as a part or all of a server. Referring to FIG. 7, the apparatus 700 includes the acquiring module 610, determining module 620, and providing module 630, where the determining module 620 includes a calculating sub-module 710, and a determining sub-module 720.

The calculating sub-module 710 is configured to calculate a similarity degree between the first photo and the second photo.

The determining sub-module 720 is configured to determine that the first photo matches the second photo, if the similarity degree reaches a predetermined similarity degree.

Figure 8:
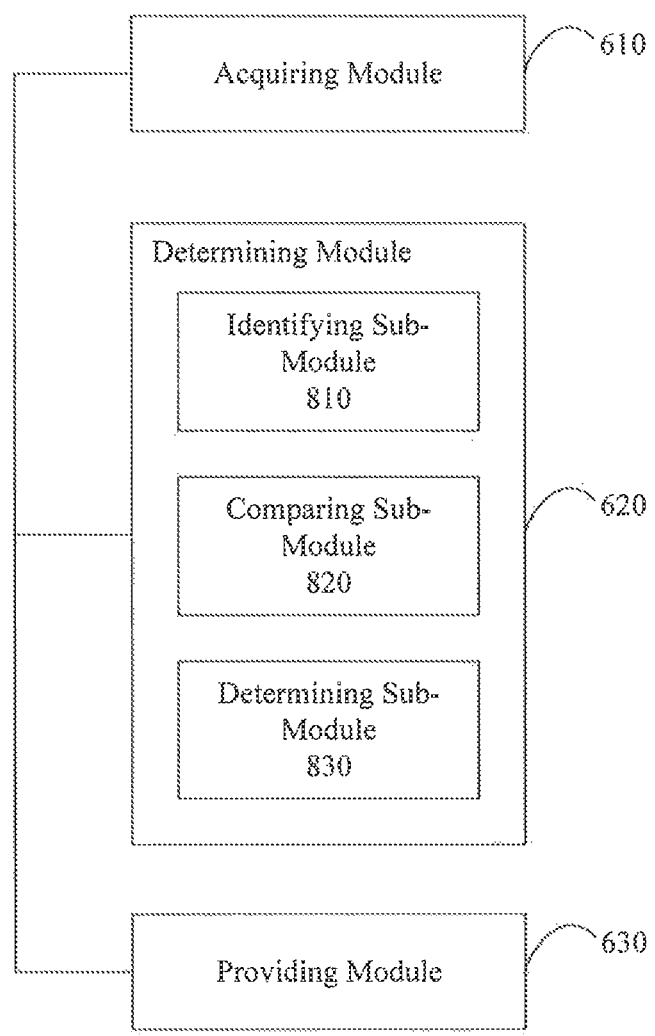
FIG. 8 is a block diagram of another apparatus for providing a contact card, according to an example embodiment.

FIG. 8 is a block diagram of another apparatus 800 for providing a contact card, according to an example embodiment. For example, the apparatus 800 may be implemented as a part or all of a server. Referring to FIG. 8, the apparatus 800 includes the acquiring module 610, determining module 620, and providing module 630, where the determining module 620 includes an identifying sub-module 810, a comparing sub-module 820, and a determining sub-module 830.

The identifying sub-module 810 is configured to identify a face image from each of the first photo and the second photo.

The comparing sub-module 820 is configured to compare the face image of the first photo with the face image of the second photo.

The determining sub-module 830 is configured to determine that the first photo matches the second photo, if the face image of the first photo matches the face image of the second photo.

Figure 9:
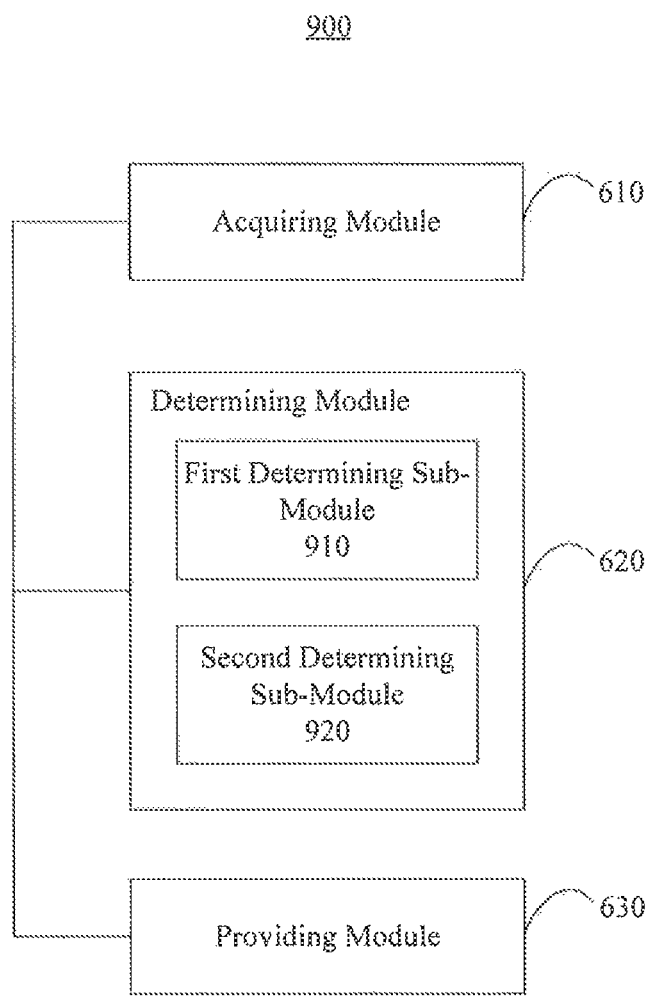
FIG. 9 is a block diagram of another apparatus for providing a contact card, according to an example embodiment.

FIG. 9 is a block diagram of another apparatus 900 for providing a contact card, according to an example embodiment. For example, the apparatus 900 may be implemented as a part or all of a server. Referring to FIG. 9, the apparatus 900 includes the acquiring module 610, determining module 620, and providing module 630, where the determining module 620 includes a first determining sub-module 910 and a second determining sub-module 920.

The first determining sub-module 910 is configured to determine an occurrence number of the first photo or the second photo in photos stored in a server, if the similarity degree between the first photo and the second photo reaches a predetermined similarity degree.

The second determining sub-module 920 is configured to determine that the first photo matches the second photo, if the occurrence number is less than or equal to a predetermined number.

Figure 10:
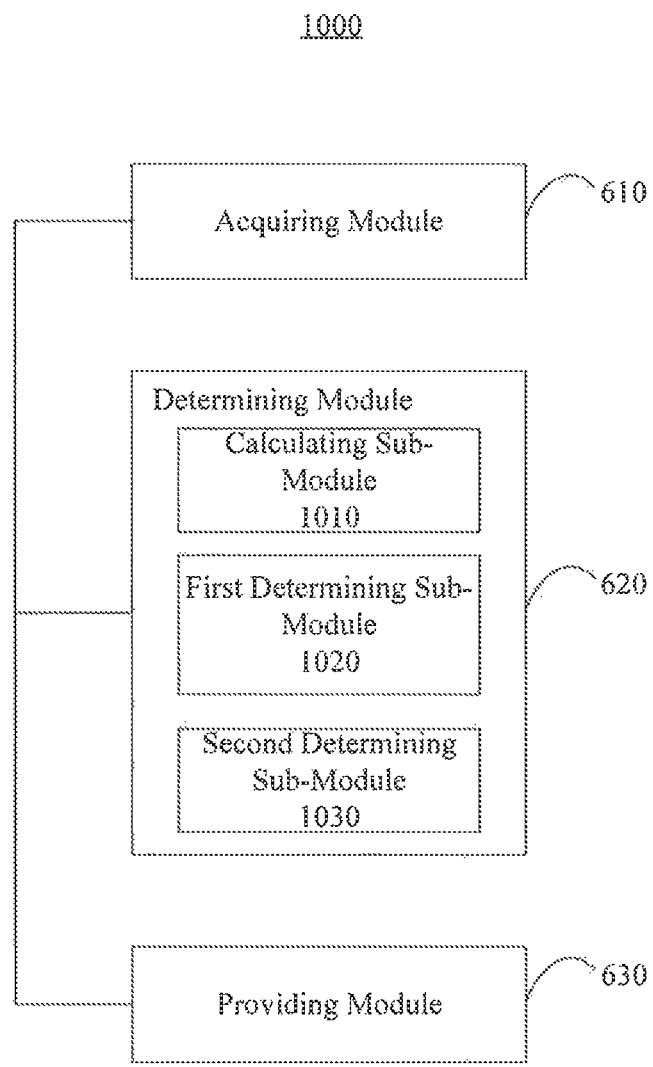
FIG. 10 is a block diagram of another apparatus for providing a contact card, according to an example embodiment.

FIG. 10 is a block diagram of another apparatus 1000 for providing a contact card, according to an example embodiment. For example, the apparatus 1000 may be implemented as a part or all of a server. Referring to FIG. 10, the apparatus 1000 includes the acquiring module 610, determining module 620, and providing module 630, where the determining module 620 further includes a calculating sub-module 1010, a first determining sub-module 1020, and a second determining sub-module 1030.

The calculating sub-module 1010 is configured to, calculate a second similarity degree between the first photo and the second photo according to the occurrence number and a first similarity degree between the first photo and the second photo, if an occurrence number of the first photo or the second photo is greater than a predetermined number. For example, the greater the occurrence number is, the smaller the second similarity degree is relative to the first similarity.

The first determining sub-module 1020 is configured to determine whether the second similarity degree reaches a predetermined similarity degree.

The second determining sub-module 1030 is configured to determine that the first photo does not match the second photo, if the second similarity degree is less than the predetermined similarity degree.

Figure 11:
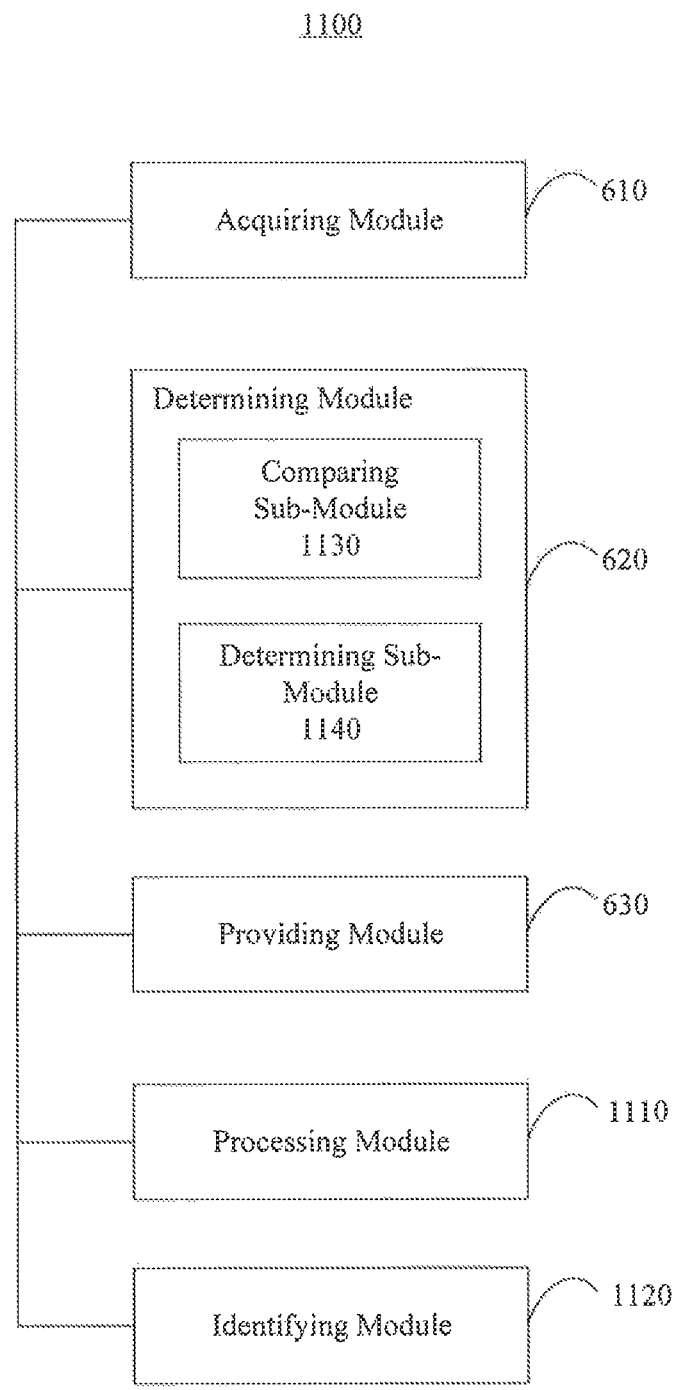
FIG. 11 is a block diagram of another apparatus for providing a contact card, according to an example embodiment.

FIG. 11 is a block diagram of another apparatus 1100 for providing a contact card, according to an example embodiment. For example, the apparatus 1100 may be implemented as a part or all of a server. Referring to FIG. 11, in addition to the acquiring module 610, determining module 620, and providing module 630, the apparatus 1100 further includes a processing module 1110 and an identifying module 1120.

The processing module 1110 is configured to perform a normalization process on the first photo and the second photo to obtain a normalized photo of each of the first photo and the second photo.

The identifying module 1120 is configured to identify one or more feature points from each normalized photo according to a predetermined rule.

As shown in FIG. 11, the determining module 620 includes a comparing sub-module 1130 and a determining sub-module 1140.

The comparing sub-module 1130 is configured to compare the feature points of the normalized photos of the first photo and the second photo.

The determining sub-module 1140 is configured to determine whether the first photo matches the second photo according to a comparison result of the feature points.

Figure 12:
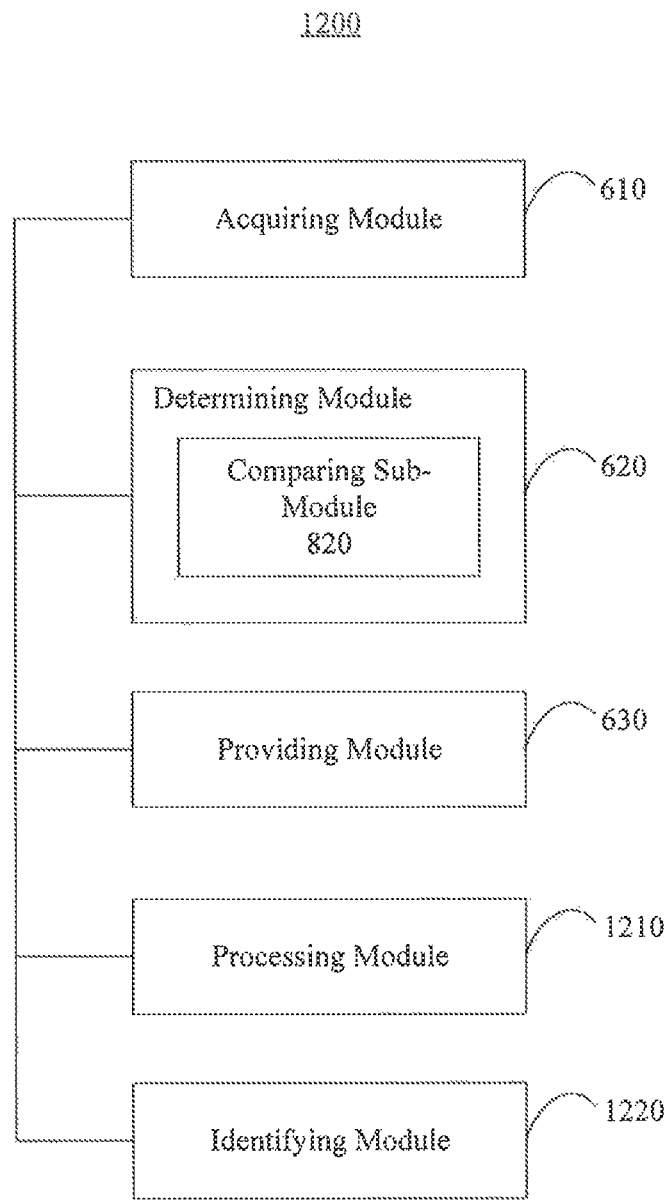
FIG. 12 is a block diagram of another apparatus for providing a contact card, according to an example embodiment.

FIG. 12 is a block diagram of another apparatus 1200 for providing a contact card, according to an example embodiment. For example, the apparatus 1200 may be implemented as a part or all of a server. As shown in FIG. 12, in addition to the acquiring module 610, determining module 620, and providing module 630, the apparatus 1200 further includes a processing module 1210 and an identifying module 1220.

The processing module 1210 is configured to perform a normalization process on the face image of each of the first photo and the second photo to obtain a normalized face image of each of the first photo and the second photo.

The identifying module 1220 is configured to identify one or more feature points from each normalized face image according to a predetermined rule.

As shown in FIG. 12, the determining module 620 includes the comparing sub-module 820. The comparing sub-module 820 is further configured to compare the feature points of the normalized face images of the first photo and the second photo and to determine whether the face image of the first photo matches the face image of the second photo according to a comparison result of the feature points.

Figure 13:
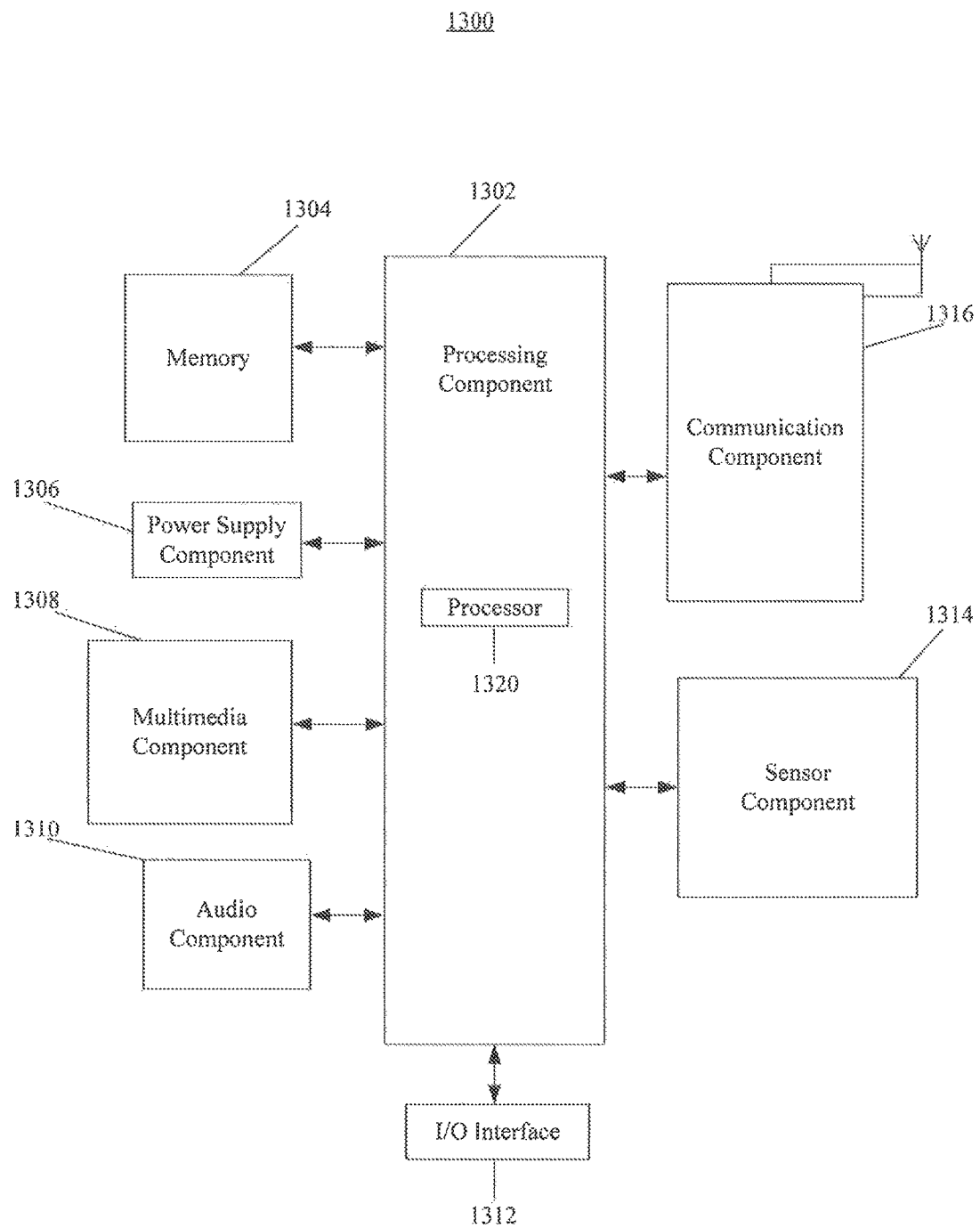
FIG. 13 is a block diagram of a server for providing a contact card, according to an example embodiment.

FIG. 13 is a block diagram of a device 1300 for providing a contact card, according to an example embodiment. The device 1300 may be provided as a user terminal discussed in the above embodiments. For example, the device 1300 may be a mobile phone, a computer, a digital broadcast terminal, a messaging device, a gaming console, a tablet, a medical device, exercise equipment, a personal digital assistant, and the like.

Referring to FIG. 13, the device 1300 may include one or more of the following components: a processing component 1302, a memory 1304, a power supply component 1306, a multimedia component 1308, an audio component 1310, an input/output (I/O) interface 1312, a sensor component 1314, and a communication component 1316. The person skilled in the art should appreciate that the structure of the device 1300 as shown in FIG. 13 does not intend to limit the device 1300. The device 1300 may include more or less components or combine some components or other different components.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, images, video, etc. The memory 1304 is also configured to store programs and modules. The processing component 1302 performs various functions and data processing by operating programs and modules stored in the memory 1304. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 1306 is configured to provide power to various components of the device 1300. The power supply component 1306 may include a power management system, one or more power sources, and any other components associated with the generation, management, and distribution of power in the device 1300.

The multimedia component 1308 includes a screen providing an output interface between the device 1300 and a user. In some embodiments, the screen may include a liquid crystal display (LCD) and/or a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like.

The buttons may include, but are not limited to, a home button, a volume button, a starting button, and a locking button.

The sensor component 1314 includes one or more sensors to provide status assessments of various aspects of the device 1300. For instance, the sensor component 1314 may detect an on/off state of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication normalized, such as 2G, 3G, 4G, or a combination thereof. In one example embodiment, the communication component 1316 receives a broadcast signal or broadcast information from an external broadcast management system via a broadcast channel. In one example embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In example embodiments, there is also provided a non-transitory computer-readable storage medium including instructions, such as included in the memory 1304, executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

Figure 14:
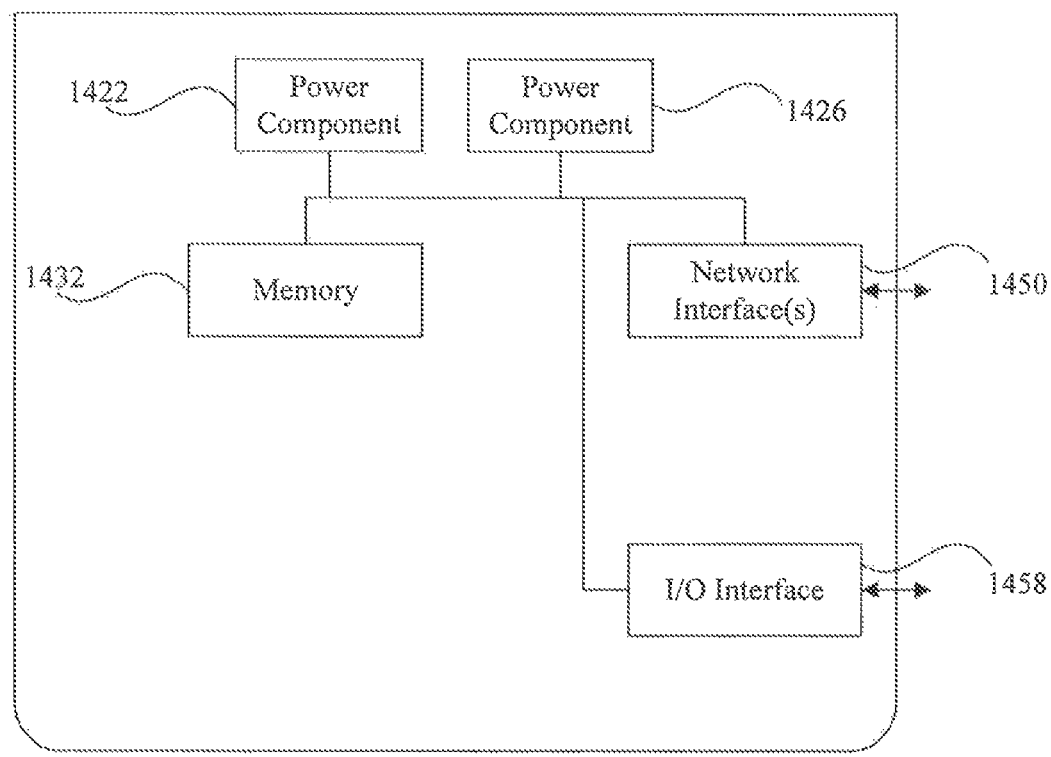
FIG. 14 is a block diagram of a user terminal for providing a contact card, according to an example embodiment.

FIG. 14 is a block diagram of a device 1400 for providing a cloud card, according to an example embodiment. For example, the device 1400 may be configured as a server. Referring to FIG. 14, the device 1400 may include a processing component 1422, which further includes one or more processors, and memory resource represented by the memory 1432, for storing the instructions (e.g., the application programs) executable by the processing component 1422. The application programs stored in the memory 1432 may include one or more module each corresponding to one set of instructions. In addition, the processing component 1422 is configured to execute instructions so as to perform the above described methods.

The device 1400 may also include a power component 1426 configured to execute a power management of the device 1400, wired or wireless network interface(s) 1450 configured to connect the device 1400 to network, and an input/output (I/O) interface 1458. The device 1400 may be operated based on the operating system stored in the memory 1432, such as Windows Server™, Mac OS X™, Unix™, Linux™, FreeBSD™, or the like.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as example only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for providing a contact card, comprising:
    acquiring a contact card of a contact person and acquiring contact information stored in a user terminal, the contact card including a first photo, and the contact information including a second photo;
    determining whether the first photo matches the second photo; and
    providing the contact card of the contact person to the user terminal, if the first photo matches the second photo;
    wherein determining whether the first photo matches the second photo comprises:
    calculating a first similarity degree between the first photo and the second photo;
    if the first similarity degree reaches a predetermined similarity degree, determining an occurrence number of the first photo or the second photo in a server; and
    determining that the first photo matches the second photo, if the occurrence number is less than or equal to a predetermined number.

2. The method of claim 1, wherein determining whether the first photo matches the second photo further comprises:
    if the occurrence number is greater than the predetermined number, calculating a second similarity degree between the first photo and the second photo according to the occurrence number and the first similarity degree; and
    determining that the first photo does not match the second photo, if the second similarity degree is less than the predetermined similarity degree.

3. The method of claim 2, wherein a value of the second similarity degree decreases when the occurrence number increases.

4. The method of claim 1, wherein determining whether the first photo matches the second photo comprises:
   identifying a face image from each of the first photo and the second photo;
   comparing the face image of the first photo with the face image of the second photo; and
   determining that the first photo matches the second photo, if the face image of the first photo matches the face image of the second photo.

5. The method of claim 4, wherein determining whether the first photo matches the second photo further comprises:
   performing a normalization process on the face image of each of the first photo and the second photo to obtain a normalized face image of each of the first photo and the second photo;
   identifying one or more feature points from each normalized face image according to a predetermined rule;
   comparing the feature points of the normalized face images of the first photo and the second photo; and
   determining whether the face image of the first photo matches the face image of the second photo according to a comparison result of the feature points.

6. The method of claim 1, further comprising:
   performing a normalization process on the first photo and the second photo to obtain a normalized photo of each of the first photo and the second photo;
   identifying one or more feature points from each normalized photo according to a predetermined rule;
   comparing the feature points of the normalized photo of the first photo and the second photo; and
   determining whether the first photo matches the second photo according to a comparison result of the feature points.

7. The method of claim 1, wherein the contact card is stored in a server of a cloud network.

8. An apparatus for providing a cloud card, comprising:
   a processor; and
   a memory for storing instructions executable by the processor,
   wherein the processor is configured to:
   acquire a contact card of a contact person and acquire contact information stored in a user terminal, the contact card including a first photo, the contact information including a second photo;
   determine whether the first photo matches the second photo; and
   provide the contact card of the contact person to the user terminal, if the first photo matches the second photo;
   wherein, in determining whether the first photo matches the second photo, the processor is further configured to:
   calculate a first similarity degree between the first photo and the second photo;
   if the first similarity degree reaches a predetermined similarity degree, determine an occurrence number of the first photo or the second photo in a server; and
   determine that the first photo matches the second photo, if the occurrence number is less than or equal to a predetermined number.

9. The apparatus of claim 8, wherein the processor is further configured to:
   if the occurrence number is greater than the predetermined number, calculate a second similarity degree between the first photo and the second photo according to the occurrence number and the first similarity degree; and
   determine that the first photo does not match the second photo, if the second similarity degree is less than the predetermined similarity degree.

10. The apparatus of claim 9, wherein a value of the second similarity degree decreases when the occurrence number increases.

11. The apparatus of claim 8, wherein the processor is further configured to:
    identify a face image from each of the first photo and the second photo;
    compare the face image of the first photo with the face image of the second photo; and
    determine that the first photo matches the second photo, if the face image of the first photo matches the face image of the second photo.

12. The apparatus of claim 11, wherein the processor is further configured to:
    perform a normalization process on the face image of each of the first photo and the second photo to obtain a normalized face image of each of the first photo and the second photo;
    identify one or more feature points from each normalized face image according to a predetermined rule;
    compare the feature points of the normalized face images of the first photo and the second photo; and
    determine whether the face image of the first photo matches the face image of the second photo according to a comparison result of the feature points.

13. The apparatus of claim 8, wherein the processor is further configured to:
    perform a normalization process on the first photo and the second photo to obtain a normalized photo of each of the first photo and the second photo;
    identify one or more feature points from the normalized photo according to a predetermined rule;
    compare the feature points of the normalized photo of the first photo and the second photo; and
    determine whether the first photo matches the second photo according to a comparison result of the feature points.

14. The apparatus of claim 8, wherein the contact card is stored in a server of a cloud network.

15. A non-transitory computer readable storage medium having stored therein instructions that, when executed by a processor of a server, cause the server to perform a method for providing a contact card, the method comprising:
    acquiring a contact card of a contact person and acquiring contact information stored in a user terminal, the contact card including a first photo, the contact information including a second photo;
    determining whether the first photo matches the second photo; and
    providing the contact card of the contact person to the user terminal, if the first photo matches the second photo;
    wherein determining whether the first photo matches the second photo comprises:
    calculating a first similarity degree between the first photo and the second photo;
    if the first similarity degree reaches a predetermined similarity degree, determining an occurrence number of the first photo or the second photo in a server; and
    determining that the first photo matches the second photo, if the occurrence number is less than or equal to a predetermined number.

* * * * *